(12) United States Patent
Davis et al.

(10) Patent No.: US 9,784,181 B2
(45) Date of Patent: Oct. 10, 2017

(54) GAS TURBINE ENGINE ARCHITECTURE WITH LOW PRESSURE COMPRESSOR HUB BETWEEN HIGH AND LOW ROTOR THRUST BEARINGS

(75) Inventors: Todd A. Davis, Tolland, CT (US); Gregory E. Reinhardt, South Glastonbury, CT (US); Enzo DiBenedetto, Torrington, CT (US)

(73) Assignee: United Technologies Corporation, Farmington, CT (US)

( * ) Notice: Subject to any disclaimer, the term of this patent is extended or adjusted under 35 U.S.C. 154(b) by 623 days.

(21) Appl. No.: 13/304,053

(22) Filed: Nov. 23, 2011

(65) Prior Publication Data

US 2012/0195753 A1    Aug. 2, 2012

Related U.S. Application Data

(63) Continuation-in-part of application No. 12/622,535, filed on Nov. 20, 2009, now Pat. No. 8,439,637.

(51) Int. Cl.
| | |
|---|---|
| F02C 7/06 | (2006.01) |
| F02C 3/107 | (2006.01) |
| F02K 3/06 | (2006.01) |
| F01D 25/16 | (2006.01) |

(52) U.S. Cl.
CPC .............. *F02C 3/107* (2013.01); *F01D 25/16* (2013.01); *F01D 25/162* (2013.01); *F02C 7/06* (2013.01); *F02K 3/06* (2013.01); *F05D 2230/72* (2013.01); *F05D 2230/80* (2013.01); *F05D 2250/232* (2013.01); *F05D 2260/38* (2013.01); *F05D 2260/40311* (2013.01); *Y02T 50/671* (2013.01)

(58) Field of Classification Search
CPC ........ F01D 25/16; F01D 25/162; F02C 3/107; F05D 2260/40311; F02K 3/062
USPC ....... 415/66, 68, 69, 122.1, 142, 216.1, 229; 416/174, 124
See application file for complete search history.

(56) References Cited

U.S. PATENT DOCUMENTS

| | | | | |
|---|---|---|---|---|
| 3,434,288 | A | * | 3/1969 | Petrie ........................... 60/226.1 |
| 4,084,861 | A | | 4/1978 | Greenberg et al. |
| 4,704,862 | A | | 11/1987 | Dennison et al. |
| 4,827,712 | A | * | 5/1989 | Coplin ......................... 60/226.1 |
| 4,867,655 | A | | 9/1989 | Barbie et al. |
| 4,916,894 | A | * | 4/1990 | Adamson et al. ........... 60/226.1 |
| 4,951,461 | A | | 8/1990 | Butler |

(Continued)

FOREIGN PATENT DOCUMENTS

| | | |
|---|---|---|
| CN | 1654805 A | 8/2005 |
| EP | 1564397 | 8/2005 |

(Continued)

OTHER PUBLICATIONS

Fledderjohn, "The TFE731-5: Evolution of a Decade of Businesse Jet Service", SAE Technical Paper, Business Aircraft Meeting & Exposition Apr. 12-15, 1983.*

(Continued)

*Primary Examiner* — Woody Lee, Jr.
*Assistant Examiner* — Jesse Prager
(74) *Attorney, Agent, or Firm* — Carlson, Gaskey & Olds, P.C.

(57) ABSTRACT

A method for servicing a gas turbine engine includes providing access from a forward section of the gas turbine engine to a gearbox contained within a bearing compartment.

23 Claims, 8 Drawing Sheets

(56) References Cited

U.S. PATENT DOCUMENTS

| | | |
|---|---|---|
| 4,952,076 A | 8/1990 | Wiley, III et al. |
| 4,981,415 A | 1/1991 | Marmol et al. |
| 5,010,729 A | 4/1991 | Adamson et al. |
| 5,433,674 A * | 7/1995 | Sheridan et al. ............ 475/346 |
| 5,622,438 A | 4/1997 | Walsh et al. |
| 5,791,789 A | 8/1998 | Van Duyn et al. |
| 6,439,772 B1 | 8/2002 | Ommundson et al. |
| 7,412,819 B2 * | 8/2008 | Bart et al. ................... 60/226.1 |
| 2008/0006018 A1 * | 1/2008 | Sheridan et al. ............. 60/39.1 |
| 2008/0098715 A1 * | 5/2008 | Orlando et al. ............ 60/226.1 |
| 2008/0098717 A1 * | 5/2008 | Orlando et al. ............ 60/226.1 |
| 2009/0123271 A1 | 5/2009 | Coffin et al. |
| 2010/0247306 A1 | 9/2010 | Merry et al. |
| 2011/0047959 A1 * | 3/2011 | DiBenedetto ............. 60/39.092 |
| 2011/0123326 A1 | 5/2011 | DiBenedetto et al. |
| 2011/0219781 A1 | 9/2011 | Benjamin et al. |

FOREIGN PATENT DOCUMENTS

| | | |
|---|---|---|
| EP | 1921253 | 5/2008 |
| EP | 2060809 | 2/2011 |
| EP | 2299092 | 3/2011 |
| GB | 2199375 | 7/1988 |
| WO | 9527860 | 10/1995 |

OTHER PUBLICATIONS

Chinese Search Report for Chinese Patent Application No. 201210481399.0 mailed on Sep. 29, 2014.
Partial European Search Report for Application No. 12192792.5 dated Aug. 9, 2016.
Shlyachtenko, S.M., Theory and Design of Air-Jet Engines, Moscow, "Mashinostroyeniye", Publishing House, 1987, pp. 15-19.
European Search Report for Application No. 12192792.5 received Nov. 15, 2016.

\* cited by examiner

FIG.8

GAS TURBINE ENGINE ARCHITECTURE WITH LOW PRESSURE COMPRESSOR HUB BETWEEN HIGH AND LOW ROTOR THRUST BEARINGS

CROSS REFERENCE TO RELATED APPLICATIONS

The present disclosure is a continuation-in-part application of U.S. patent application Ser. No. 12/622,535, filed Nov. 20, 2009 now U.S. Pat. No. 8,439,637.

BACKGROUND

The present disclosure relates to a gas turbine engine, and in particular, to a case structure therefor.

Epicyclic gearboxes with planetary or star gear trains may be used in gas turbine engines for their compact designs and efficient high gear reduction capabilities. Planetary and star gear trains generally include three gear train elements: a central sun gear, an outer ring gear with internal gear teeth, and a plurality of planet gears supported by a planet carrier between and in meshed engagement with both the sun gear and the ring gear. The gear train elements share a common longitudinal central axis, about which at least two rotate.

During flight, light weight structural cases deflect with aero and maneuver loads which may cause significant deflection commonly known as backbone bending of the engine. This deflection may result in some misalignment of the gear train elements which may lead to efficiency losses and potential reduced life. Management of the deflections of the static and rotating components as well as minimization of heat loads facilitate successful engine architectures.

SUMMARY

A gas turbine engine according to an exemplary aspect of the present disclosure includes a low pressure compressor along an axis, a first bearing system which at least partially supports an inner shaft along the axis, a second bearing system which at least partially supports an outer shaft along the axis; and a low pressure compressor hub mounted to the inner shaft, the low pressure compressor hub extends to the low pressure compressor between the first bearing system and the second bearing support.

In a further non-limiting embodiment of any of the foregoing gas turbine engine embodiments, the low pressure compressor hub may include a frustro-conical web which extends between the first bearing system and the second bearing support.

In a further non-limiting embodiment of any of the foregoing gas turbine engine embodiments, the frustro-conical web may extend at least partially around the first bearing support.

In a further non-limiting embodiment of any of the foregoing gas turbine engine embodiments, the low pressure compressor may be radially outboard of the first bearing support. Additionally or alternatively, the low pressure compressor hub may be angled toward the low pressure compressor.

In a further non-limiting embodiment of any of the foregoing gas turbine engine embodiments, the low pressure compressor hub may be mounted to a second stage disk of the low pressure compressor. Additionally or alternatively, the low pressure compressor may include three stages.

In a further non-limiting embodiment of any of the foregoing gas turbine engine embodiments, the inner shaft may drive a fan through a geared architecture.

In a further non-limiting embodiment of any of the foregoing gas turbine engine embodiments, the first bearing system may be mounted to a front center body case structure, the front center body case structure may define a core flow path for a core airflow.

In a further non-limiting embodiment of any of the foregoing gas turbine engine embodiments, the second bearing system may be mounted to an intermediate case structure, the intermediate case structure may be mounted to the front center body case structure to continue the core flow path.

A gas turbine engine according to another exemplary aspect of the present disclosure includes a front center body case structure, a geared architecture at least partially supported by the front center body case structure, a first bearing system mounted to the front center body case structure to rotationally support an inner shaft, a coupling shaft mounted to the inner shaft and the geared architecture, the coupling shaft at least partially supported by the first bearing support.

In a further non-limiting embodiment of any of the foregoing gas turbine engine embodiments, the inner shaft may drive a fan through the geared architecture.

In a further non-limiting embodiment of any of the foregoing gas turbine engine embodiments, may further comprise an outer shaft which may at least partially surround the inner shaft, the outer shaft drives a high pressure compressor.

In a further non-limiting embodiment of any of the foregoing gas turbine engine embodiments, a second bearing system may at least partially support an outer shaft.

In a further non-limiting embodiment of any of the foregoing gas turbine engine embodiments, a low pressure compressor hub may be mounted to the inner shaft, the low pressure compressor hub may extend to a low pressure compressor between the first bearing system and the second bearing support.

In a further non-limiting embodiment of any of the foregoing gas turbine engine embodiments, the low pressure compressor may include three stages, the low pressure compressor hub may be mounted to a second stage disk of the low pressure compressor.

A gas turbine engine according to another exemplary aspect of the present disclosure includes a front center body case structure along an engine axis, the front center body case structure defines a core flow path, a low pressure compressor along the core flow path, an intermediate case structure mounted aft of the front center body case structure along the engine axis, a first bearing system mounted to the front center body case structure to at least partially support an inner shaft for rotation about the engine axis, a second bearing system mounted to the intermediate case structure to at least partially support an outer shaft for rotation about the engine axis, a low pressure compressor hub mounted to the inner shaft, the low pressure compressor hub extends to the low pressure compressor between the first bearing system and the second bearing support.

In a further non-limiting embodiment of any of the foregoing gas turbine engine embodiments, the front center body case structure may be downstream of a fan.

In a further non-limiting embodiment of any of the foregoing gas turbine engine embodiments, the inner shaft may drive the fan through a geared architecture.

In a further non-limiting embodiment of any of the foregoing gas turbine engine embodiments, the geared architecture may be at least partially supported by the front center body case structure.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
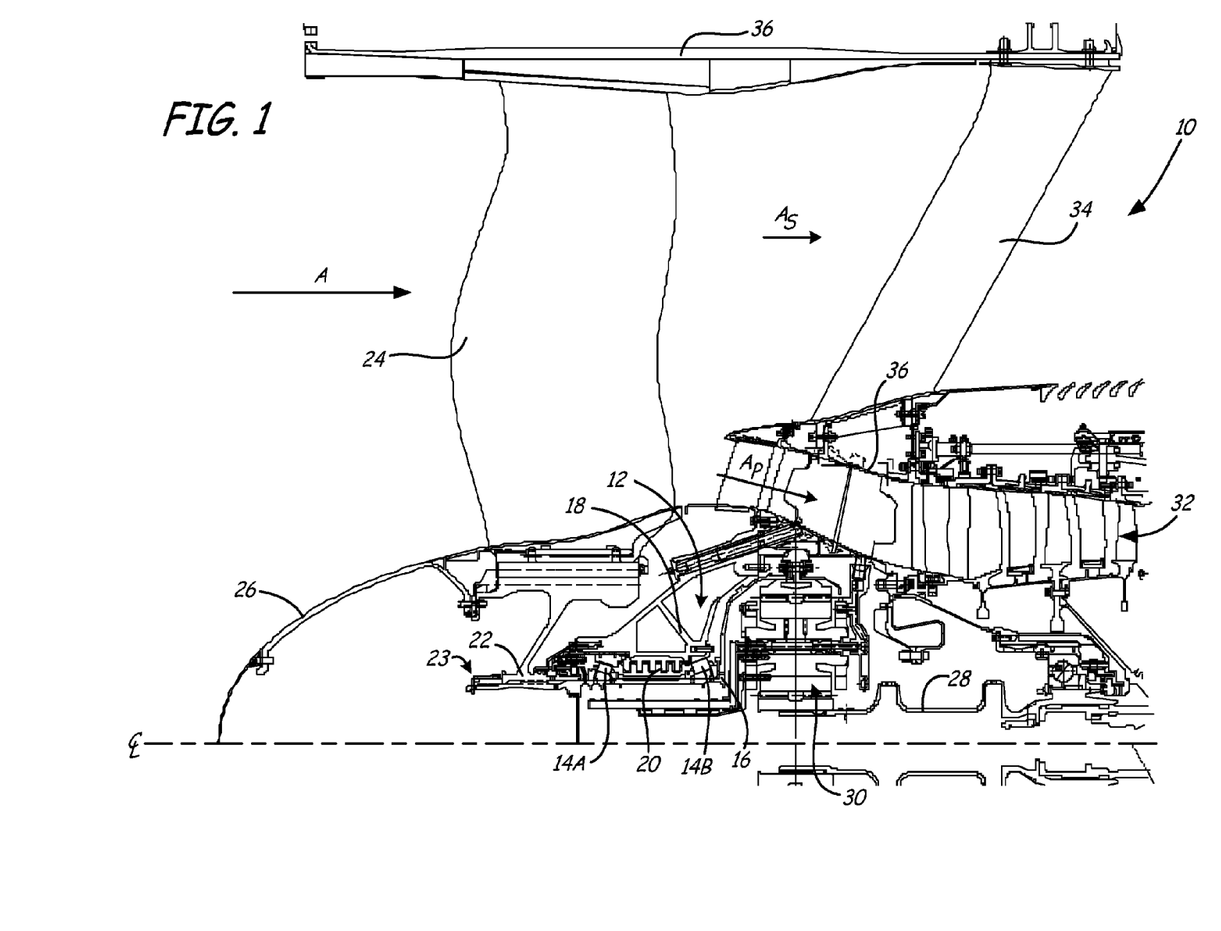
FIG. 1 is a schematic cross-section of a forward portion of a gas turbine engine.

FIG. 1 shows a forward section of gas turbine engine 10 above engine centerline $C_L$ of gas turbine engine 10. Gas turbine engine 10 includes bearing compartment 12, first and second tapered roller bearings 14A and 14B, fan shaft 16, bearing system 18, bellows spring 20, fan hub 22, nut 23, fan blades 24, fan nose 26, engine shaft 28, fan drive gear system 30, compressor section 32, guide vanes 34, and engine case 36.

Bearing compartment 12 is disposed adjacent fan shaft 16 and contains first and second tapered roller bearings 14A and 14B therein. Fan shaft 16 rotates about an axis that aligns with engine centerline axis $C_L$ and is supported on tapered roller bearings 14A and 14B. Bearing compartment 12 is bounded by fan shaft 16 and bearing system 18 which connects to the tapered roller bearings 14A and 14B. Bearing system 18 extends to connect to a non-rotational frame such as an engine case of gas turbine engine 10. Bellows spring 20 is disposed in bearing compartment 12 adjacent first tapered roller bearing 14A and second tapered roller bearing 14B. Bellows spring 20 applies a preload to both first tapered roller bearing 14A and second tapered roller bearing 14B. Nut 23 is positioned adjacent the fan hub 22 and applies a clamping force to the radially inner race portion of first tapered roller bearing 14A and the inner race portion of second tapered roller bearing 14B.

Fan shaft 16 connects to and turns fan blades 24 through fan hub 22. Fan hub 22 also connects to fan nose 26. Fan shaft 16 connects to engine shaft 28 via fan drive gear system 30. Compressor section 32 is disposed radially outward of engine centerline $C_L$ and is connected to engine shaft 28. Guide vanes 34 are disposed radially outward of compressor section 32 and are rotatable relative to engine case 36.

The operational principles of gas turbine engine 10 are well known in the art, and therefore, will not be discussed in great detail. As illustrated in FIG. 1, gas turbine engine 10 comprises a high bypass ratio geared turbofan engine. In other embodiments, gas turbine engine 10 can comprise another type of gas turbine engine used for aircraft propulsion or power generation. Similarly, bearing compartment 12 can comprise any bearing compartment in engine 10.

Fan shaft 16 and compressor section 32 are connected to a turbine section (not shown) through engine shaft 28. Inlet air A enters engine 10 whereby it is divided into streams of a primary air $A_P$ and a secondary air $A_S$ after passing through the fan blades 18. The fan blades 24 are rotated by turbine section (not shown) of engine 10 through engine shaft 28 to accelerate the secondary air $A_S$ (also known as bypass air) through exit guide vanes 34, thereby producing a significant portion of the thrust output of engine 10. The primary air $A_P$ (also known as gas path air) is directed into compressor section 32. Compressor section 32 works together to incrementally increase the pressure and temperature of primary air $A_P$.

Figure 2:
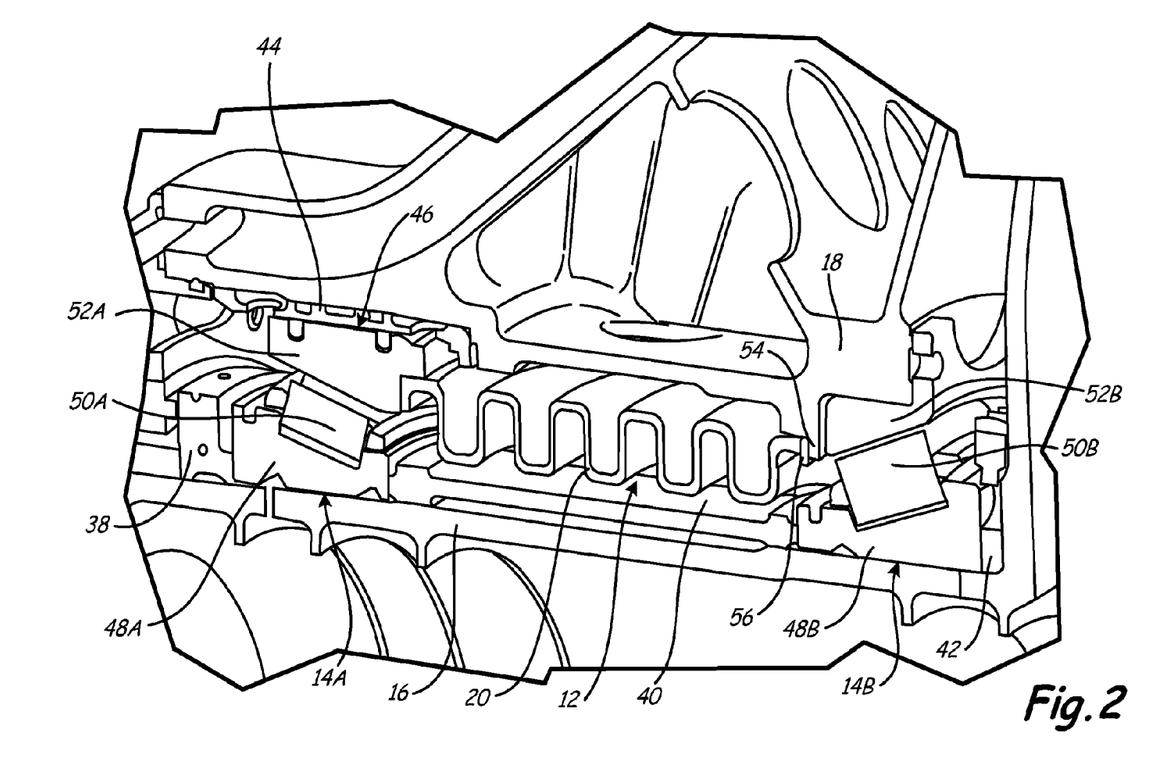
FIG. 2 is a perspective cross-sectional view of a bearing compartment including a first tapered roller bearing, a second tapered roller bearing and a bellows spring.

FIG. 2 shows a perspective cross-sectional view of bearing compartment 12 including first tapered roller bearing 14A, second tapered roller bearing 14B, and bellows spring 20. Additionally, bearing compartment 12 includes seal plate 38, bearing spacer 40, gear 42, secondary sleeve 44, and squeeze film damper system 46. First and second tapered roller bearings 14A and 14B include inner races 48A and 48B, roller elements 50A and 50B, and outer races 52A and 52B, respectively. Also shown are shoulder 54 of bearing system 18 and shim 56.

Within bearing compartment 12, seal plate 38 abuts a forward portion of (as defined by the direction of primary air $A_P$ flow within the gas turbine engine 10) first tapered roller bearing 14A. Seal plate 38 comprises a portion of the carbon sealing system and is disposed adjacent inner race 48A. Bearing spacer 40 abuts both inner races 48A and 48B to provide necessary spacing between first and second tapered roller bearings 14A and 14B. Gear 42 is contacted by inner race 48B of second tapered roller bearing 14B and connects to a shoulder portion of fan shaft 16. In the embodiment shown in FIG. 2, secondary sleeve 44 is disposed between outer race 52A of first tapered roller bearing 14A and bearing system 18. Tapered roller bearings 14A and 14B can also be supported by squeeze film damper system 46 (of which only seals are shown) disposed between one or more of the tapered roller bearings 14A and 14B and bearing system 18. Squeeze film damper systems such as the one disclosed herein are well known in the art and are used to shift critical speeds and/or to increase the dynamic stability of a rotor-bearing system.

In particular, first and second tapered roller bearings 14A and 14B have inner races 48A and 48B that are clamped or otherwise affixed to fan shaft 16. Inner races 48A and 48B have radially outward surfaces (raceways) that interface with roller elements 50A and 50B, respectively. Outer races 52A and 52B interface with roller elements 50A and 50B, respectively, and are mounted to bearing system 18. In the embodiment shown in FIG. 2, outer race 52A of first tapered roller bearing 14A is constrained radially and tangentially but can move axially relative to secondary sleeve 44, bearing system 18, and portions of squeeze film damper system 46. This allows roller element 50A to remain in contact with inner raceway of outer race 52A. Outer race 52B of second tapered roller bearing 14B is fastened to bearing system 18. First and second tapered roller bearings 14A and 14B are retained by bearing system 18, which reacts loads back through to the engine case 36.

In one embodiment, a forward end of bellows spring 20 is snapped into an interference fit with outer race 52A, and an aft end of bellows spring 20 is snapped into an interference fit with shoulder 54 of bearing system 18. Thus, bellows spring 20 is positioned generally between first tapered roller bearing 14A and second tapered roller bearing 14B. At least one shim 56 can be positioned between the aft end of bellows spring 20 and shoulder 54. Shim 56 allows the spring preload to be accurately set to a desired level without requiring restrictive manufacturing tolerances of bellows spring 20, bearing system 18, or other components.

Nut 23 (FIG. 1) applies a clamping force which reacts through inner race 48A of first tapered roller bearing 14A, through bearing spacer 48, through inner race 48B of second tapered roller bearing 14B, and against gear 42 on fan shaft 16. Bellows spring 20 applies preload to both first tapered roller bearing 14A and second tapered roller bearing 14B. In particular, bellows spring 20 applies preload to outer race 52A and applies preload to bearing system 18 which transfers preload to outer race 52B of second tapered roller bearing 14B.

Figure 3:
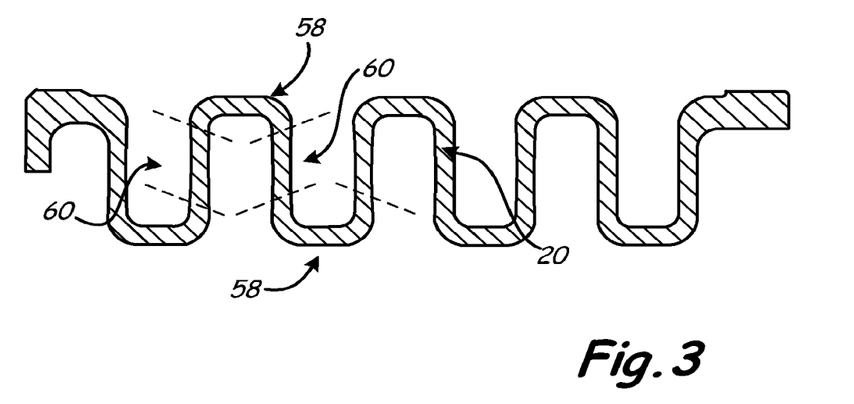
FIG. 3 is an enlarged cross section of the bellows spring of FIG. 2.

FIG. 3 shows an enlarged cross section of one embodiment of bellows spring 20. In the embodiment shown in FIG. 3, bellows spring 20 is a resilient member that is shaped as a corrugated single piece annular ring. Bellows spring 20 is comprised of a hardened stainless steel. Bellows spring 20 is lathe turned to produce the corrugated shape shown. As illustrated in FIG. 3, bellows spring 20 can have a cross-sectional thickness that is variable as the bellows spring 20 extends axially along an engine centerline $C_L$ (FIG. 1).

The number of turns (convolutes) of bellows spring 20 should be maximized (as limited by the size of the bearing compartment 12 and manufacturing practicality) to allow the bellows spring 20 to better accommodate different tolerances of components within the bearing compartment 12. Analytical tools such as commercially available finite element analysis software can be used to simulate stresses on bellows spring 20 in order to optimize its geometry (number of turns, cross-sectional thicknesses, etc.) and performance. In one embodiment, the turns of bellow spring 20 have a modified omega shape, that is each convolute section 58 of bellows spring 20 extends forward and aft of adjacent interconnection sections 60 (i.e., bellows spring 20 has sections 58 which bend forward or aft relative adjacent sections 60). Other embodiments can have parallel convolutes to simplify the manufacturing of bellows spring 20.

The use of bellows spring 20 to apply preload to first tapered roller bearing 14A and second tapered roller bearing 14B allows a single element to be used in the confined space of bearing compartment 12, thereby saving space and reducing manufacturing costs. Bellows spring 20 is adapted to apply preload to first and second tapered roller bearings 14A and 14B in the axial direction along the engine centerline $C_L$ (FIG. 1), and act as a centering spring (i.e., have a radial stiffness with respect to the engine centerline $C_L$) for the squeeze film damper system 46 (FIG. 2). Bellows spring 20 is accommodating of flexing in the radial direction by first tapered roller bearing 14A and the second tapered roller bearing 14B such that bellows spring 20 does not excessively wear on the surfaces of the bearings 14A and 14B.

Figure 4:
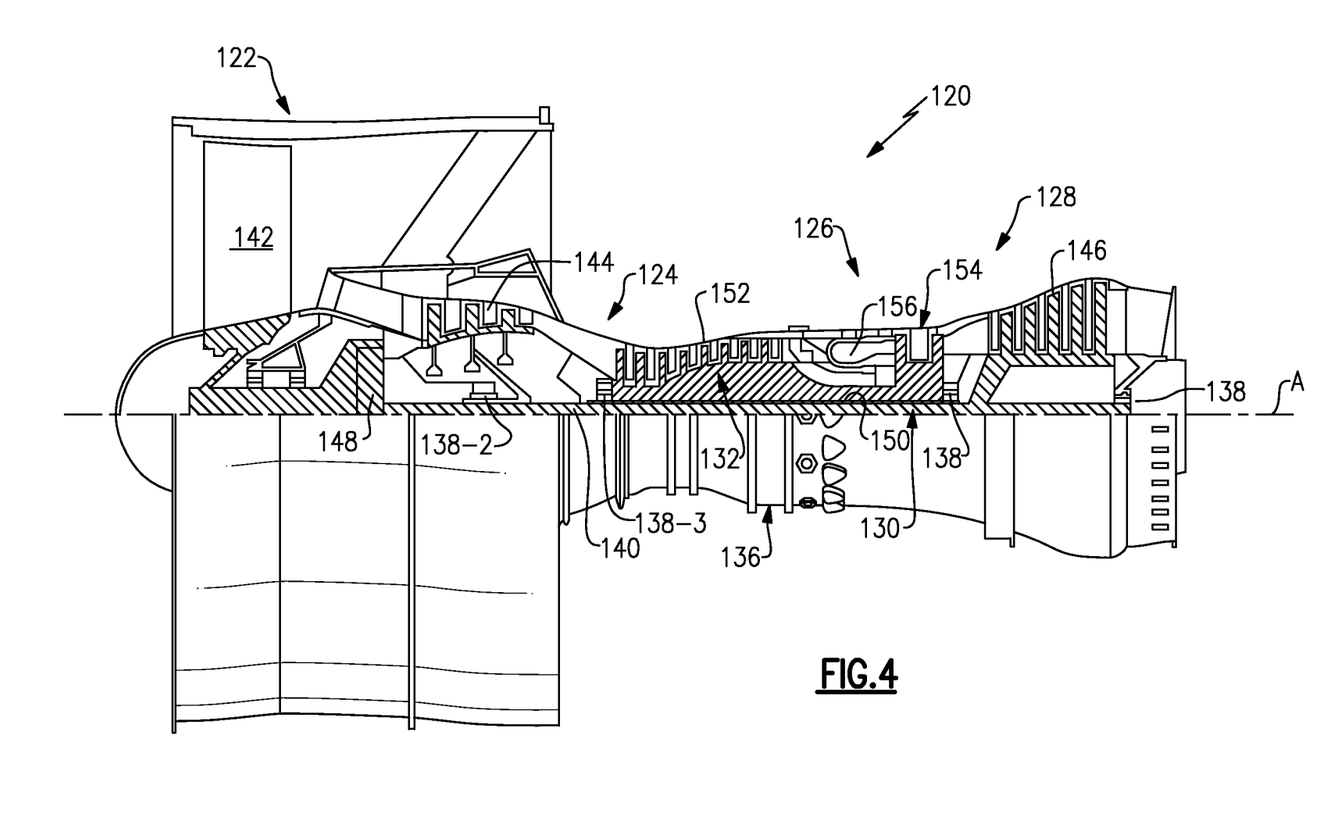
FIG. 4 is a schematic cross-section of a gas turbine engine.

FIG. 4 schematically illustrates another exemplary gas turbine engine 120. The gas turbine engine 120 is disclosed herein as a two-spool turbofan that generally incorporates a fan section 122, a compressor section 124, a combustor section 126 and a turbine section 128. Alternative engines might include an augmentor section (not shown) among other systems or features. The fan section 122 drives air along a bypass flowpath while the compressor section 124 drives air along a core flowpath for compression and communication into the combustor section 126 then expansion through the turbine section 128. Although depicted as a turbofan gas turbine engine in the disclosed non-limiting embodiment, it should be understood that the concepts described herein are not limited to use with turbofans as the teachings may be applied to other types of turbine engines such as a three-spool (plus fan) engine wherein an intermediate spool includes an intermediate pressure compressor (IPC) between the LPC and HPC and an intermediate pressure turbine (IPT) between the HPT and LPT.

The engine 120 generally includes a low spool 130 and a high spool 132 mounted for rotation about an engine central longitudinal axis A relative to an engine static structure 136 via several bearing supports 138. The low spool 130 generally includes an inner shaft 140 that interconnects a fan 142, a low pressure compressor 144 and a low pressure turbine 146. The inner shaft 140 drives the fan 142 through a geared architecture 148 to drive the fan 142 at a lower speed than the low spool 130. An exemplary reduction transmission is an epicyclic transmission, namely a planetary or star gear system.

The high spool 132 includes an outer shaft 150 that interconnects a high pressure compressor 152 and high pressure turbine 154. A combustor 156 is arranged between the high pressure compressor 152 and the high pressure turbine 154. The inner shaft 140 and the outer shaft 150 are concentric and rotate about the engine central longitudinal axis A which is collinear with their longitudinal axes.

Core airflow is compressed by the low pressure compressor 144 then the high pressure compressor 152, mixed with the fuel and burned in the combustor 156, then expanded over the high pressure turbine 154 and low pressure turbine 146. The turbines 154, 146 rotationally drive the respective low spool 130 and high spool 132 in response to the expansion.

The main engine shafts 140, 150 are supported at a plurality of points by bearing supports 138 within the static structure 136. In one non-limiting embodiment, bearing supports 138 includes a #2 bearing system 138-2 located radially inboard of the compressor section 124.

Figure 5:
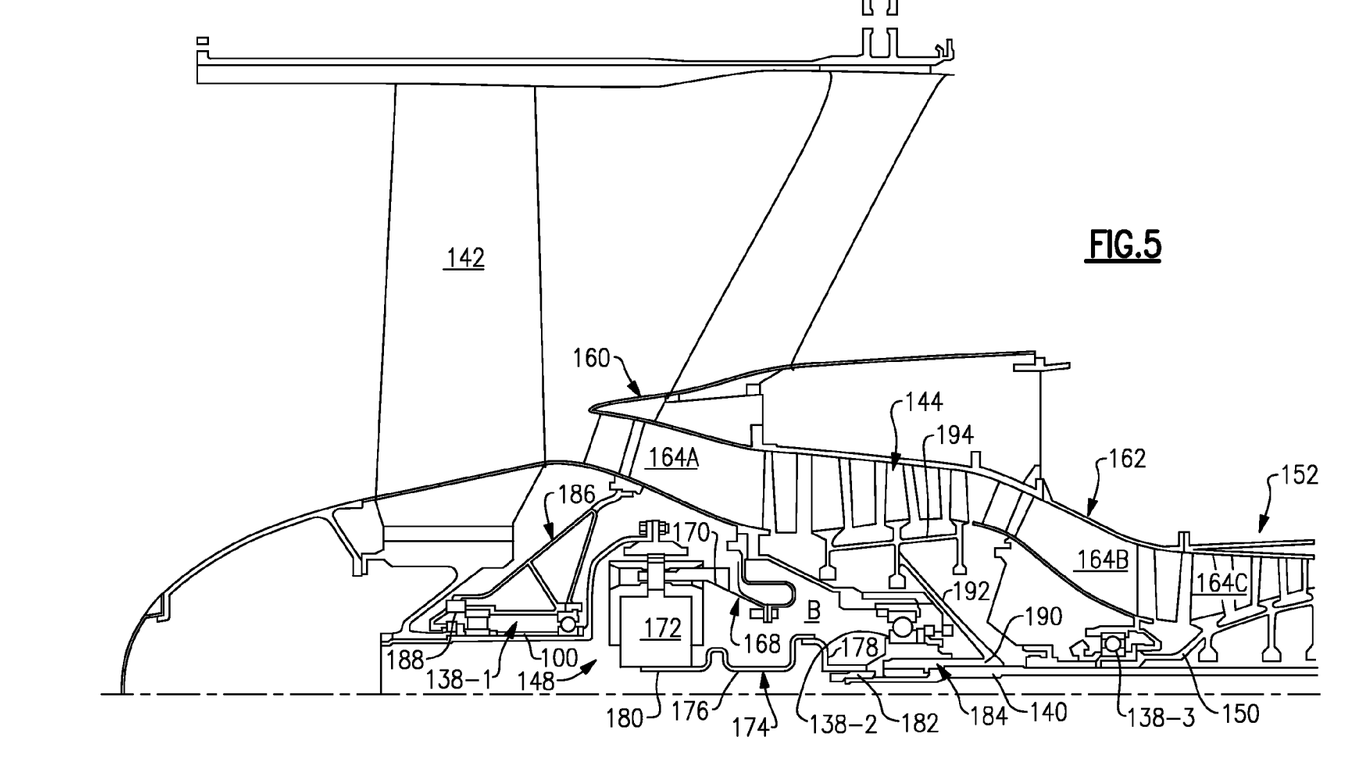
FIG. 5 is an enlarged schematic cross-section of a sectional of the gas turbine engine which illustrates a front center body case structure.

With reference to FIG. 5, the engine static structure 136 proximate the compressor section 124 generally includes a front center body case structure 160 and an intermediate case structure 162 which mounts aft of the front center body case structure 160. It should be appreciate that various case structures may alternatively or additionally be provided, yet benefit from the architecture described herein.

The front center body case structure 160 generally defines an annular core flow path 164A for the core airflow into the low pressure compressor 144. The intermediate case structure 162 defines a core flow path 164B which continues the core flow path 164A for the core airflow into the high pressure compressor 152 of core flow path 164C. The core flow path 164B is generally radially inward of the core flow path 164A to transition into the radially smaller diameter core flow path 164C. That is, the core flow path 164B defines a "wasp waist" gas turbine engine architecture.

A #2 bearing system 138-2 at least partially supports the inner shaft 140 relative to the front center body case structure 160. A #3 bearing system 138-3 generally supports the outer shaft 150 relative the intermediate case structure 162. That is, the #2 bearing system 138-2 at least partially supports the low spool 130 and the #3 bearing system 138-3 generally supports the high spool 132. It should be appreciated that various bearing systems such as thrust bearing structures and mount arrangements will benefit herefrom.

A flex support 168 provides a flexible attachment of the geared architecture 48 within the front center body case structure 160. The flex support 168 reacts the torsional loads from the geared architecture 148 and facilitates vibration absorption as well as other support functions. A centering spring 170 which is a generally cylindrical cage-like structural component with a multiple of beams that extend between flange end structures resiliently positions the #2 bearing system 138-2 with respect to the low spool 130. In one embodiment, the beams are double-tapered beams arrayed circumferentially to control a radial spring rate that may be selected based on a plurality of considerations including, but not limited to, bearing loading, bearing life, rotor dynamics, and rotor deflection considerations.

The gearbox 172 of the geared architecture 148 is driven by the low spool 130 in the disclosed non-limiting embodiment through a coupling shaft 174. The coupling shaft 174 transfers torque bearing system to the gearbox 172. The #2 bearing system 138-2 s facilitates the segregation of vibrations and other transients from the gearbox 172. The coupling shaft 174 in the disclosed non-limiting embodiment includes a forward coupling shaft section 176 and an aft coupling shaft section 178. The forward coupling shaft section 176 includes an interface spline 180 which mates with the gearbox 172. An interface spline 182 of the aft coupling shaft section 178 connects the coupling shaft 174 to the low spool 130 through, in this non limiting embodiment, a low pressure compressor hub 184 of the low pressure compressor 144.

A fan rotor bearing system structure 186 aft of the fan 142 extends radially inward from the front center body case structure 160. The fan rotor bearing system structure 86 and the front center body case structure 160 define a bearing compartment B. It should be appreciated that various bearing supports 138-1 and seals 188 (illustrated schematically and in FIG. 5) may be supported by the fan rotor bearing system structure 186 to contain oil and support rotation of an output shaft 200 which connects with the geared architecture 148 to drive the fan 142.

Figure 6:
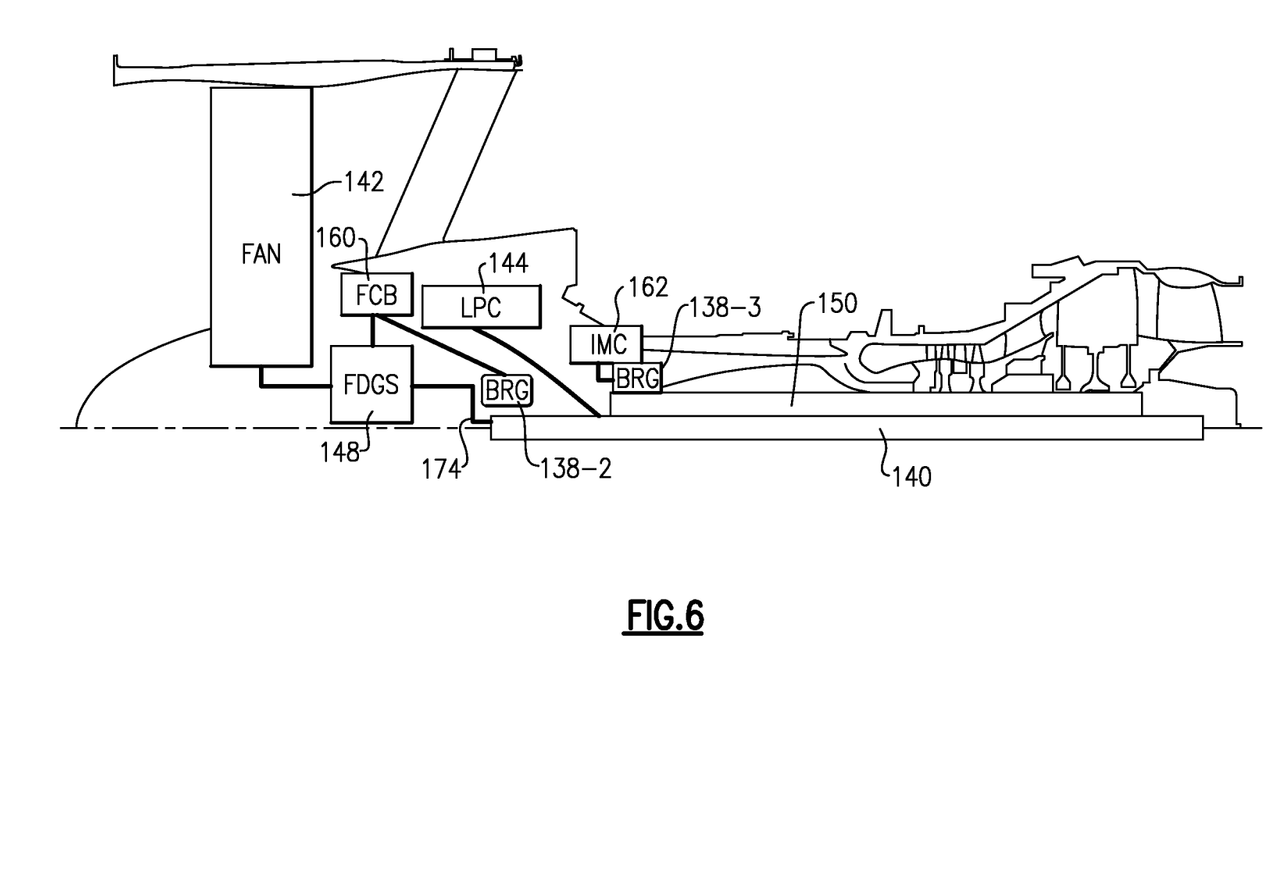
FIG. 6 is a schematic block diagram of a gas turbine engine with the inventive architecture.

The low pressure compressor hub 184 of the low pressure compressor 144 includes a tubular hub 190 and a frustro-conical web 192. The tubular hub 190 mounts to the inner shaft 140 through, for example, a splined interface. The tubular hub 190 is adjacent to the #2 bearing system 138-2. The frustro-conical web 192 extends in a forwardly direction from the tubular hub 190 axially between the #2 bearing system 138-2 and the #3 bearing system 138-3 (also shown in FIG. 6). That is, the frustro-conical web 192 is axially located between the bearing supports 138-2, 138-3.

The frustro-conical web 192 mounts to a low pressure compressor rotor 194 of the low pressure compressor 144. In the disclosed non-limiting embodiment, the frustro-conical web 192 extends between the bearing supports 138-2, 138-3 and mounts to a second stage of a three stage low pressure compressor rotor 194. It should be appreciated that the frustro-conical web 192 may mount to other stages in other engine architectures and such architectures may include other numbers of stages.

Figure 7:
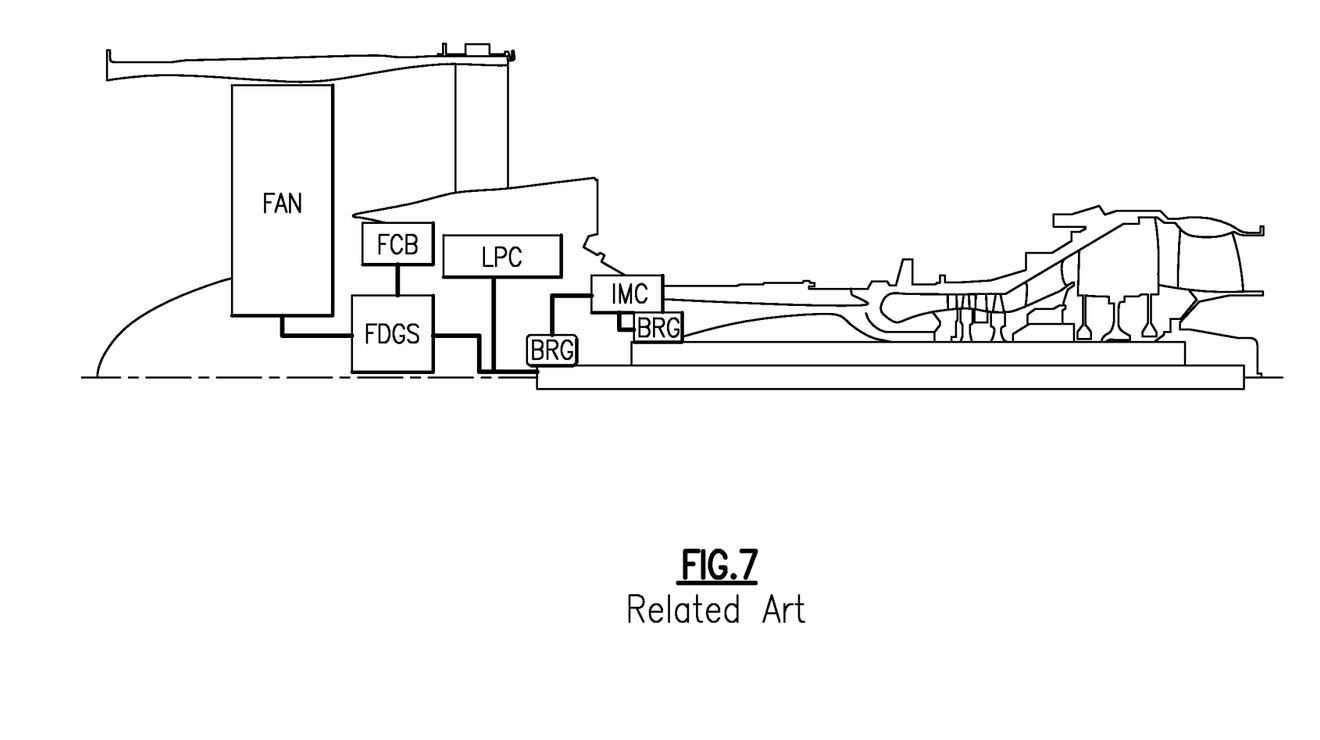
FIG. 7 is a schematic block diagram of a RELATED ART gas turbine engine with the inventive architecture.

Locating the low pressure compressor hub 184 between the #2 bearing system 138-2 and the #3 bearing system 138-3 offers significant advantage to reduce deflection for the geared architecture 48 as compared to a related art architecture such as the example illustrated in FIG. 7; RELATED ART. That is, both end sections of the coupling shaft 174 are tied to the front center body case structure 160 such that relative deflections between the end sections thereof are greatly reduced. This facilitates a more efficient balance of baseline torque, FBO torques, maneuver deflections and the minimization of the overall loads that are translated into the geared architecture 148.

Moreover, a relatively less complicated bearing compartment B which facilitates increased manufacturing tolerances is defined to, for example, require fewer seals which minimizes potential oil leak sources and saves weight.

Figure 8:
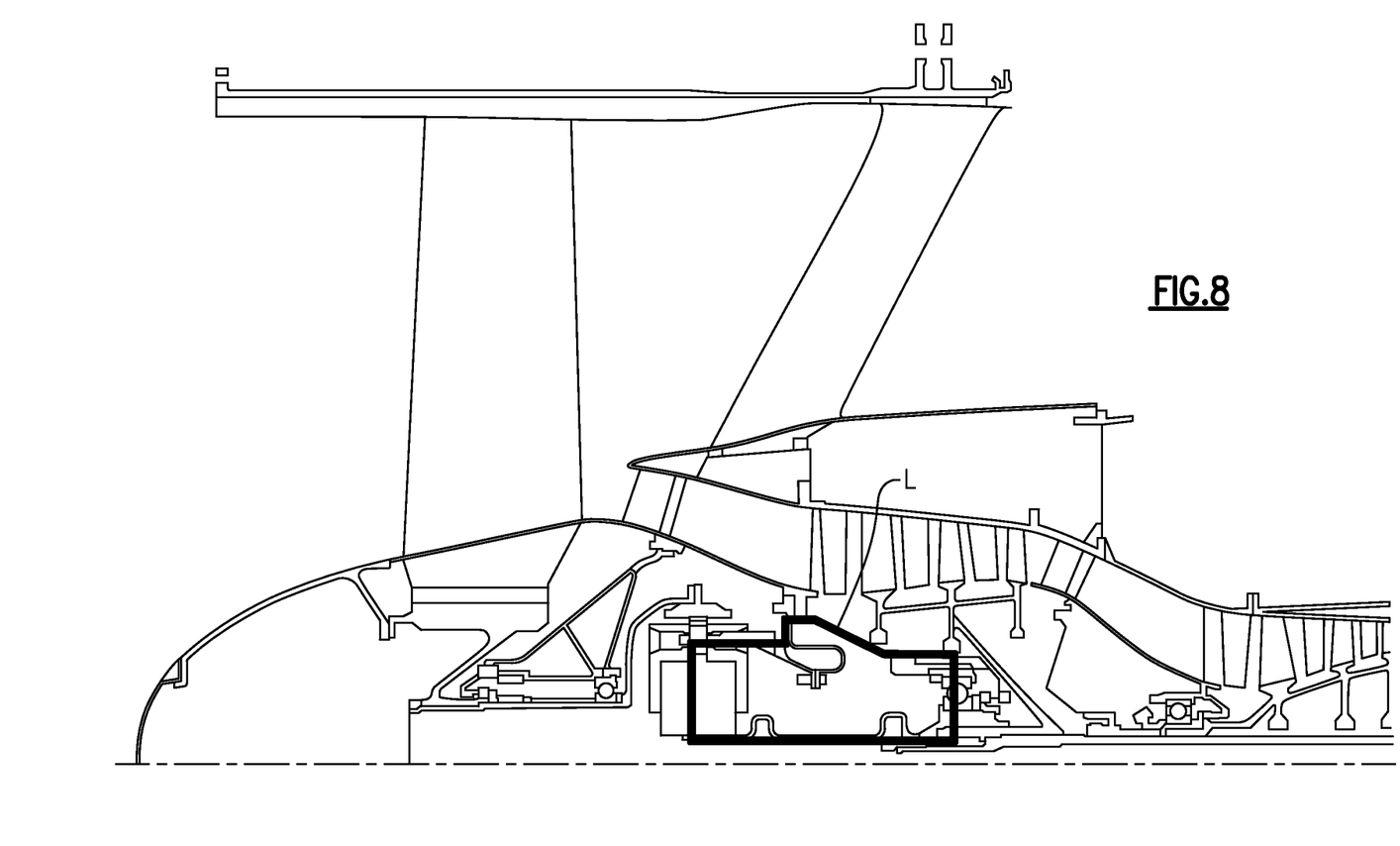
FIG. 8 is an enlarged schematic cross-section of the FIG. 5 sectional of the gas turbine engine which illustrates a load path within the front center body case structure.

The architecture further facilitates an efficient load path (L; FIG. 8) for the geared architecture and an overall lower overall heat generation and oil flow. That is, a more compact load path L is defined by the forward center body structure 160 alone. Secondary benefits are reduced oil tank size, reduced cooler sizing and reduce oil quantity in the engine lubrication system.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A gas turbine engine comprising:
   a low pressure compressor along an axis;
   a first bearing system which at least partially supports an inner shaft along said axis;
   a second bearing system which at least partially supports an outer shaft along said axis, the second bearing system positioned upstream from inlet stage vanes of a high pressure compressor; and
   a low pressure compressor hub mounted to said inner shaft, said low pressure compressor hub extends forwardly to said low pressure compressor between said first bearing system and said second bearing system, wherein said low pressure compressor hub supports a plurality of stages of said low pressure compressor, wherein at least one of the plurality of stages is positioned axially between the first bearing system and the second bearing system, said inner shaft to drive a fan through a geared architecture,
   wherein said low pressure compressor hub includes a tubular hub for supporting the inner circumference portion of said first bearing system and a frustro-conical web extending from a rear portion of said tubular hub to said low pressure compressor across the space between said first bearing system and said second bearing system.

2. The gas turbine engine as recited in claim 1, wherein said frustro-conical web extends at least partially around said first bearing system.

3. The gas turbine engine as recited in claim 2, wherein said low pressure compressor is radially outboard of said first bearing system.

4. The gas turbine engine as recited in claim 1, wherein said low pressure compressor hub is angled toward said low pressure compressor.

5. The gas turbine engine as recited in claim 1, wherein low pressure compressor hub is mounted to a second stage disk of said low pressure compressor.

6. The gas turbine engine as recited in claim 5, wherein said low pressure compressor includes three stages.

7. The gas turbine engine as recited in claim 1, wherein said first bearing system is mounted to a front center body case structure, said front center body case structure defines a core flow path for a core airflow.

8. The gas turbine engine as recited in claim 7, wherein said second bearing system is mounted to an intermediate case structure, said intermediate case structure mounted to said front center body case structure to continue said core flow path.

9. A gas turbine engine comprising:
a front center body case structure;
a geared architecture at least partially supported by said front center body case structure;
a first bearing system mounted to said front center body case structure to rotationally support an inner shaft;
a coupling shaft mounted to said inner shaft and said geared architecture, said coupling shaft at least partially supported by said first bearing support; and
a low pressure compressor hub mounted to said inner shaft, said low pressure compressor hub extends forwardly relative to a general direction of flow through the gas turbine engine to a low pressure compressor between said first bearing system and a second bearing system which at least partially supports an outer shaft, the second bearing system positioned upstream from inlet stage vanes of a high pressure compressor, wherein at least a portion of said coupling shaft axially overlaps at least a portion of a compressor rotor supported by said low pressure compressor hub, wherein said low pressure compressor includes a plurality of stages and at least one of the plurality of stages is positioned axially between the first bearing system and the second bearing system;
wherein said low pressure compressor hub includes a tubular hub for supporting the inner circumference portion of said first bearing system and a frustro-conical web extending from a rear portion of said tubular hub to said low pressure compressor across the space between said first bearing system and said second bearing system.

10. The gas turbine engine as recited in claim 9, wherein said inner shaft drives a fan through said geared architecture.

11. The gas turbine engine as recited in claim 9, wherein said outer shaft at least partially surrounds said inner shaft, said outer shaft drives a high pressure compressor.

12. The gas turbine engine as recited in claim 9, wherein said low pressure compressor includes three stages, said low pressure compressor hub mounted to a low pressure compressor rotor at a position that is axially aligned with a second stage disk of said low pressure compressor.

13. A gas turbine engine comprising:
a front center body case structure along an engine axis, said front center body case structure defines a core flow path;
a low pressure compressor along said core flow path;
an intermediate case structure mounted aft of said front center body case structure along said engine axis;
a first bearing system mounted to said front center body case structure to at least partially support an inner shaft for rotation about said engine axis;
a second bearing system mounted to said intermediate case structure to at least partially support an outer shaft for rotation about said engine axis, said second bearing system upstream from an inlet stage of a high pressure compressor; and
a low pressure compressor hub mounted to said inner shaft, said low pressure compressor hub is attached to a low pressure compressor rotor that extends forwardly from said low pressure compressor rotor to said low pressure compressor between said first bearing system and said second bearing system, said low pressure compressor hub extending from a position that is radially inboard said first bearing system to a position that is radially outboard of said first bearing system, wherein said low pressure compressor includes a plurality of stages and at least one of the plurality of stages is positioned axially between the first bearing system and the second bearing system, said inner shaft to drive said fan through a geared architecture,
wherein said low pressure compressor hub includes a tubular hub for supporting the inner circumference portion of said first bearing system and a frustro-conical web extending from a rear portion of said tubular hub to said low pressure compressor across the space between said first bearing system and said second bearing system.

14. The gas turbine engine as recited in claim 13, wherein said front center body case structure is downstream of a fan.

15. The gas turbine engine as recited in claim 14, wherein said geared architecture is at least partially supported by said front center body case structure.

16. The gas turbine engine as recited in claim 2, wherein said frustro-conical web supports rotating blades of a stage of said low pressure compressor that is axially rearward said first bearing system.

17. The gas turbine engine as recited in claim 1, wherein said low pressure compressor hub is connected to a low pressure compressor rotor that extends from a position that is spaced from and axially rearward of said first bearing system to a position that is spaced from and axially forward of said first bearing system.

18. The gas turbine engine as recited in claim 9, wherein said low pressure compressor hub is connected to a low pressure compressor rotor that extends from a position that is spaced from and axially rearward of said first bearing system to a position that is spaced from and axially forward of said first bearing system.

19. The gas turbine engine as recited in claim 13, wherein the position that is radially inboard said first bearing system is radially spaced from said first bearing system and the position that is radially outboard of said first bearing system is radially spaced from said first bearing system, wherein said low pressure compressor hub is connected to a low pressure compressor rotor that extends from a position that is spaced from and axially rearward of said first bearing system to a position that is spaced from and axially forward of said first bearing system.

20. The gas turbine engine as recited in claim 16, wherein said frustro-conical web further supports rotating blades of a stage of said low pressure compressor that is axially forward said first bearing system.

21. The gas turbine engine as recited in claim 1, wherein the geared architecture is upstream from the first bearing system.

22. The gas turbine engine as recited in claim 9, wherein the geared architecture is upstream from the first bearing system.

23. The gas turbine engine as recited in claim 13, wherein the geared architecture is upstream from the first bearing system.

\* \* \* \* \*